US012626714B2

(12) United States Patent
Huang et al.

(10) Patent No.: US 12,626,714 B2
(45) Date of Patent: May 12, 2026

(54) RECOVERY OF VOICE AUDIO QUALITY USING A DEEP LEARNING MODEL

(71) Applicant: BOSE CORPORATION, Framingham, MA (US)

(72) Inventors: Chuan-Che Huang, Framingham, MA (US); Somasundaram Meiyappan, Chennai (IN); Nathan Blagrove, Hanover, MA (US); Elio Dante Querze, III, Arlington, MA (US); Shuo Zhang, Belmont, MA (US); Isaac Keir Julien, Cambridge, MA (US); Francois Laberge, Framingham, MA (US); Alaganandan Ganeshkumar, North Attleboro, MA (US)

(73) Assignee: Bose Corporation, Framingham, MA (US)

( * ) Notice: Subject to any disclaimer, the term of this patent is extended or adjusted under 35 U.S.C. 154(b) by 301 days.

(21) Appl. No.: 18/554,027

(22) PCT Filed: Apr. 22, 2022

(86) PCT No.: PCT/US2022/026003
§ 371 (c)(1),
(2) Date: Oct. 5, 2023

(87) PCT Pub. No.: WO2022/231977
PCT Pub. Date: Nov. 3, 2022

(65) Prior Publication Data

US 2024/0371388 A1 Nov. 7, 2024

(30) Foreign Application Priority Data

Apr. 29, 2021 (IN) ............................ 202121019693

(51) Int. Cl.
*G10L 21/0232* (2013.01)
*G10K 11/178* (2006.01)
(Continued)

(52) U.S. Cl.
CPC .... *G10L 21/0232* (2013.01); *G10K 11/17823* (2018.01); *G10K 11/17881* (2018.01);
(Continued)

(58) Field of Classification Search
CPC ..... G10L 21/0232; G10L 25/21; G10L 25/30; G10K 11/17823; G10K 11/17881;
(Continued)

(56) References Cited

U.S. PATENT DOCUMENTS

2014/0200883 A1* 7/2014 Usher ...................... H04R 3/00 704/205
2015/0179178 A1 6/2015 Usher et al.
2017/0249954 A1 8/2017 Kim

FOREIGN PATENT DOCUMENTS

KR 20110035344 A 4/2011
WO 2017116022 A1 7/2017

OTHER PUBLICATIONS

International Search Report and Written Opinion for International Application No. PCT/US2022/026003 Mailed Aug. 2, 2022.

* cited by examiner

*Primary Examiner* — Paul Kim
*Assistant Examiner* — Douglas J Suthers
(74) *Attorney, Agent, or Firm* — Patterson + Sheridan, LLP

(57) ABSTRACT

Certain aspects provide methods and apparatus for recovering audio quality of voice when processing signals associated with a wearable audio output device. A method that may be performed includes receiving, by an in-ear microphone acoustically coupled to an environment inside an ear canal of a user, an audio signal having a first frequency band, predicting high-frequency band information for the audio signal using a model trained using training data of known high-frequency bands associated with low-frequency bands, generating an output signal having a second frequency band based, at least in part, on the first frequency band of the audio signal and the predicted high-frequency band information for the audio signal, and outputting, by the wearable audio output device, the output signal having the second frequency band.

20 Claims, 5 Drawing Sheets

(51) Int. Cl.
*G10L 25/21* (2013.01)
*G10L 25/30* (2013.01)
*H04R 1/10* (2026.01)

(52) U.S. Cl.
CPC .............. *G10L 25/21* (2013.01); *G10L 25/30* (2013.01); *H04R 1/1083* (2013.01); *G10K 2210/1081* (2013.01); *G10K 2210/3026* (2013.01); *G10K 2210/3027* (2013.01); *G10K 2210/30351* (2013.01); *G10K 2210/3038* (2013.01); *H04R 2460/01* (2013.01)

(58) Field of Classification Search
CPC ... G10K 2210/1081; G10K 2210/3026; G10K 2210/3027; G10K 2210/3051; G10K 2210/3038; H04R 1/1083; H04R 2460/01
USPC .......................................................... 381/71.6
See application file for complete search history.

RECOVERY OF VOICE AUDIO QUALITY USING A DEEP LEARNING MODEL

CROSS-REFERENCE TO RELATED APPLICATIONS

This application is a national stage application under 35 U.S.C. 371 of PCT/US2022/026003, filed Apr. 22, 2022, which claims priority to and benefit of Indian Patent Application number 202121019693, filed Apr. 29, 2021, the contents of which are herein incorporated by reference in their entirety as fully set forth below.

FIELD

This application claims priority to and benefit of Indian Patent Application No. 202121019693, filed Apr. 29, 2021, the contents of which are herein incorporated by reference in its entirety as fully set forth below.

Aspects of the present disclosure generally relate to enhancing audio quality of voice when using an in-ear microphone. As described in more detail herein, high frequency audio quality of voice may be recovered using a model trained to recognize patterns between high and low-frequency bands.

BACKGROUND

Wearable audio output devices, such as headphones or earbuds, may include any number of microphones. One or more microphones of the wearable audio output device may be contained in a structure proximal to a mouth of a user of the wearable audio output device to pick up speech produced by the user. However, voice signal quality may be degraded by outside interference where one or more microphones are exposed to an external environment.

Advancements in wearable audio output devices incorporate in-ear microphones to mitigate such issues. In-ear microphones may be placed inside an ear canal of the user where it captures in-ear voice signal. With a good seal of the ear canal, the in-ear voice signal may be relatively isolated from ambient external noise. As such, the in-ear microphone may be efficient for communicating in environments where external microphones become unusable.

Unfortunately, voice pickup by an in-ear microphone has its own limitations. In-ear microphones significantly degrade the dynamic range (e.g., bandwidth) of a user's voice, and while it is possible to communicate with a narrow range, the user's voice may be muffled and have relatively low intelligibility, thereby making speech of the user less natural.

Therefore, there is a need for improvements in the voice quality pickup when using in-ear microphones.

SUMMARY

All examples and features mentioned herein can be combined in any technically possible manner.

Aspects provide methods and apparatus for recovering audio quality of voice when processing signals associated with a wearable audio output device. According to aspects, the wearable audio output device may include an in-ear microphone acoustically coupled to an environment inside an ear canal of a user, and in some cases, additionally, an external microphone acoustically coupled to an environment outside the ear canal of the user.

Certain aspects provide a method performed by a wearable audio output device. The method includes receiving, by an in-ear microphone acoustically coupled to an environment inside an ear canal of a user, an audio signal having a first frequency band, predicting high-frequency band information for the audio signal using a model trained using training data of known high-frequency bands associated with low-frequency bands, generating an output signal having a second frequency band based, at least in part, on the first frequency band of the audio signal and the predicted high-frequency band information for the audio signal, and outputting, by the wearable audio output device, the output signal having the second frequency band.

In certain aspects, the second frequency band of the output signal comprises a dynamic range greater than a dynamic range of the first frequency band.

In certain aspects, predicting high-frequency band information for the audio signal using the model trained using training data of known high-frequency bands associated with low-frequency bands comprises extracting low-frequency band information of the first frequency band and selecting the high-frequency band information based at least in part on a mapping between the low-frequency band information and the high-frequency band information in the trained model.

In certain aspects, the method further comprises receiving, by an external microphone acoustically coupled to an environment outside the ear canal of the user, an external signal and determining the environment comprises a noisy environment by comparing a signal energy of the audio signal to a signal energy of the external signal. In certain aspects, the method further comprises processing the audio signal using active noise reduction (ANR) to produce a noise reduced signal, wherein the noise reduced signal is generated in response to the external signal and has a third frequency band; predicting high-frequency band information for the noise reduced signal using the trained model; and wherein the output signal is based, at least in part, on the third frequency band of the noise reduced signal and the predicted high-frequency band information for the noise reduced signal. In certain aspects, processing the audio signal using ANR to produce a noise reduced signal comprises calculating a set of noise cancellation parameters in response to the external signal and utilizing the set of noise cancellation parameters to process the audio signal.

In certain aspects, the method further comprises receiving feedback associated with a voice of a user of the wearable audio output device and wherein the trained model is further trained based on the feedback.

In certain aspects, the trained model comprises a trained deep neural network.

Certain aspects provide a wearable audio output device, comprising at least one in-ear microphone acoustically coupled to an environment inside an ear canal of a user, the at least one in-ear microphone configured to receive an audio signal having a first frequency band; at least one processor and a memory coupled to the at least one in-ear microphone, the memory including instructions executable by the at least one processor to cause the wearable audio output device to: predict high-frequency band information for the audio signal using a model trained using training data of known high-frequency bands associated with low-frequency bands; and generate an output signal having a second frequency band based, at least in part, on the first frequency band of the audio signal and the predicted high-frequency band information for the audio signal; and at least one speaker coupled to the at least one in-ear microphone, the at least one speaker configured to: output the output signal having the second frequency band.

In certain aspects, the second frequency band of the output signal comprises a dynamic range greater than a dynamic range of the first frequency band.

In certain aspects, in order to predict high-frequency band information for the audio signal using the model trained using training data of known high-frequency bands associated with low-frequency bands, the memory further includes instructions executable by the at least one processor to cause the wearable audio output device to: extract low-frequency band information of the first frequency band; and select the high-frequency band information based at least in part on a mapping between the low-frequency band information and the high-frequency band information in the trained model.

In certain aspects, the wearable audio output device of claim further comprises at least one external microphone acoustically coupled to an environment outside the ear canal of the user, wherein the at least one external microphone is configured to receive an external signal; and wherein the memory further includes instructions executable by the at least one processor to determine the environment comprises a noisy environment by comparing a signal energy of the audio signal to a signal energy of the external signal.

In certain aspects, the memory further includes instructions executable by the at least one processor to: process the audio signal using active noise reduction (ANR) to produce a noise reduced signal, wherein the noise reduced signal is generated in response to the external signal and has a third frequency band, predict high-frequency band information for the noise reduced signal using the trained model. In aspects, the output signal is based, at least in part, on the third frequency band of the noise reduced signal and the predicted high-frequency band information for the noise reduced signal.

In certain aspects, in order to process the audio signal using ANR to produce a noise reduced the memory further includes instructions executable by the at least one processor to cause the wearable audio output device to: calculate a set of noise cancellation parameters in response to the external signal and utilize the set of noise cancellation parameters to process the audio signal.

In certain aspects, memory further includes instructions executable by the at least one processor to: receive feedback associated with a voice of a user of the wearable audio output device and the trained model is further trained based on the feedback.

In certain aspects, the trained model comprises a trained deep neural network.

Certain aspects provide a computer-readable medium storing instructions which when executed by at least one processor performs a method for recovering audio quality of voice when processing signals associated with a wearable audio output device, the method comprising receiving, by an in-ear microphone acoustically coupled to an environment inside an ear canal of a user, an audio signal having a first frequency band, predicting high-frequency band information for the audio signal using a model trained using training data of known high-frequency bands associated with low-frequency bands, generating an output signal having a second frequency band based, at least in part, on the first frequency band of the audio signal and the predicted high-frequency band information for the audio signal, and outputting, by the in-ear microphone, the output signal having the second frequency band.

In certain aspects, the second frequency band of the output signal comprises a dynamic range greater than a dynamic range of the first frequency band.

In certain aspects, predicting high-frequency band information for the audio signal using the model trained using training data of known high-frequency bands associated with low-frequency bands comprises extracting low-frequency band information of the first frequency band and selecting the high-frequency band information based at least in part on a mapping between the low-frequency band information and the high-frequency band information in the trained model.

In certain aspects, the method further comprises receiving, by an external microphone acoustically coupled to an environment outside the ear canal of the user, an external signal and determining the environment comprises a noisy environment by comparing a signal energy of the audio signal to a signal energy of the external signal

DETAILED DESCRIPTION

Figure 1:
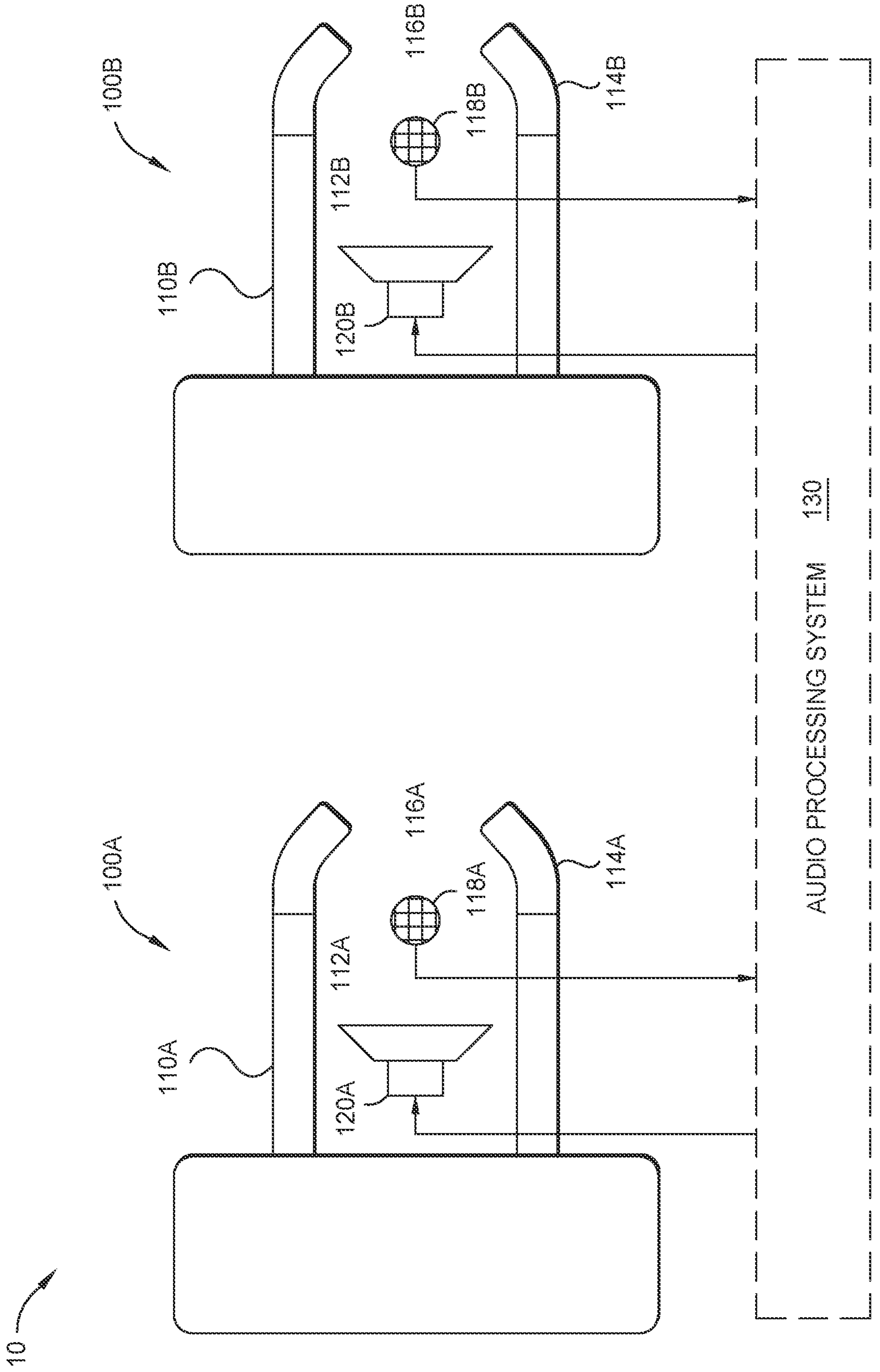
FIG. 1 illustrates an example wearable audio output device, in accordance with certain aspects of the present disclosure.

Mobile technology and connectivity has changed the way people communicate with each other, with latest developments enabling communication at nearly any time in nearly every location. Consequently, ensuring effective speech communication, using audio output devices, in noisy environments remains a challenge.

In an example use case, a user, while communicating with close friends or family members using a wearable audio output device, may concurrently decide to engage in outside activity, such as walking their dog. Although a wearable audio output device provides a suitable way to communicate with others while engaging in outside activity, background noise, or even a gentle breeze of wind, may overtake speech picked up by a microphone. As a result, the user's voice may become inaudible to others to whom the user was communicating with while using the wearable audio output device.

Some modern audio wearable device designs include an in-ear microphone to mitigate issues associated with communication in noisy environments. Bone and tissue conducted speech captured using an in-ear microphone is stable against surrounding noise and has been introduced in such environments to provide a relatively high signal-to-noise ratio (SNR) signal. Because the origin of the speech signal obtained by the in-ear microphone is the vibration of a user's skull, as opposed to air propagation, the signal is not contaminated by background noise.

Unfortunately, the limited bandwidth of bone and tissue conducted speech captured by the in-ear microphone has a critical effect on the quality of the speech. While bone and tissue conducted speech generally includes strong low frequency components, high frequency components of the bone and tissue conducted speech are attenuated considerably due to channel loss. Accordingly, audio quality of speech detected by the in-ear microphone includes a significantly degraded dynamic range, thereby making the detected speech less natural, and in some cases, unintelligible.

Aspects of the present disclosure provide techniques for enhancing audio quality of voice when using an in-ear microphone. More specifically, high frequency audio quality of voice may be recovered using a deep learning model trained to predict high frequency band information of captured bone and tissue conducted speech. For example, high frequency band predictions may be facilitated using deep learning and/or other machine learning technologies. Predicted high frequency band information may be used for restoration of voice quality in voice pick-up, by an in-ear microphone, to provide improved audio quality (e.g., to another person in communication with a user of the wearable audio output device).

Machine learning techniques, whether deep learning networks or other experiential/observational learning systems, may be used to build a model trained to recognize patterns between high and low-frequency bands of a user's speech. The model may be based on sample data, known as "training data", in order to make predictions without being explicitly programmed to do so.

According to certain aspects, the trained model may be a trained deep neural network (DNN). "Deep learning" is a subset of machine learning that uses a set of algorithms to model high-level abstractions in data using a deep graph with multiple processing layers including linear and non-linear transformations. Deep learning may be a very large neural network, appropriately called a DNN.

Accordingly, the trained DNN may be a model that has learned patterns based on a plurality of inputs and outputs, e.g., low-frequency bands and high-frequency bands of voice, respectively. In some examples, the model may be generalized to represent patterns among population data. In some examples, the model may be specific to the voice of a user of the wearable audio output device.

FIG. 1 illustrates an example wearable audio output device 10, in accordance with certain aspects of the present disclosure. As shown, wearable audio output device 10 includes a pair of earbuds (or headphones) 100A and 100B (e.g., individually referred to herein as earbud 100 or collectively referred to herein as earbuds 100) that may be communicatively coupled with a portable user device (e.g., phone, tablet, etc.). In an aspect, earbuds 100 may be wirelessly connected to the portable user device using one or more wireless communication methods including, but not limited to, Bluetooth, Wi-Fi, Bluetooth Low Energy (BLE), other radio frequency (RF)-based techniques, or the like. In an aspect, earbuds 100 may be connected to the portable user device using a wired connection, with or without a corresponding wireless connection.

While components of each earbud 100 may be described herein using reference numerals without the appended "A" or B" for simplicity, each earbud 100 may include identical components described herein with respect to FIG. 1.

Each earbud 100 may include a respective cavity 112 defined by a casing 110. Each cavity 112 may include at least one acoustic transducer 120 (also known as a driver or speaker) for outputting sound to a user of the wearable audio output device. The included acoustic transducer(s) may be configured to transmit audio through air and/or through bone (e.g., via bone conduction, such as through the bones of the skull).

Each earbud 100 may further include at least one in-ear microphone 118 disposed within cavity 112. In implementations where wearable audio output device 10 is ear-mountable, an ear coupling 114 (e.g., an ear tip or ear cushion) may be attached to the casing 110 and surround an opening to the cavity 112. A passage 116 may be formed through the ear coupling 114 and communicate with the opening to the cavity 112. Accordingly, the in-ear microphone 118 may be acoustically coupled to an environment inside an ear canal of a user of the wearable audio output device 10.

Sound waves generated by a user's vocal chords and modulated by the user's vocal tract may be received by in-ear microphone 118 through the ear canal of the user. Because each earbud 100 fills, or otherwise blocks, the outer portion of the user's ear canal, bone-conducted sound vibrations of a person's own voice in the space between a tip of the ear mold and the user's eardrum may cause voice captured by microphone 118 to be muffled. This phenomenon is known as the occlusion effect. It is caused by an altered balance between air-conducted and bone-conducted transmission to the human ear. When the ear canal is open, vibrations caused by talking normally escape through the open ear canal. When the ear canal is blocked, i.e. occluded, the vibrations are instead reflected back towards the eardrum. The occlusion effect causes a loss of treble of sound waves detected by in-ear microphone 118 thereby degrading a dynamic range of the user's voice causing speech of the user communicated to others to sound distorted.

Figure 2:
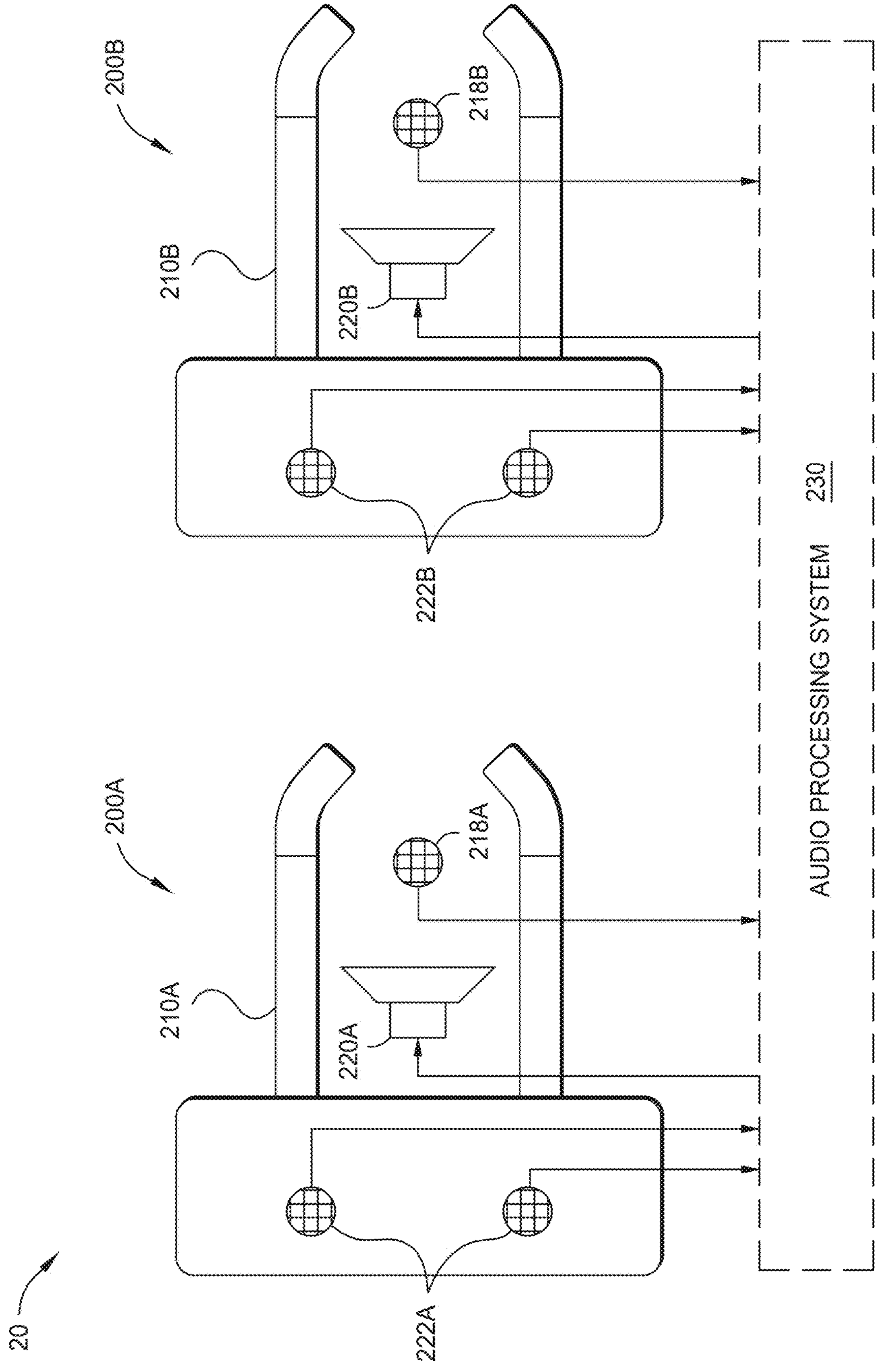
FIG. 2 illustrates another example wearable audio output device, in accordance with certain aspects of the present disclosure.

In some wearable audio output device implementations, an external microphone may be introduced to better achieve natural sounding speech. FIG. 2 illustrates another example wearable audio output device 20, in accordance with certain aspects of the present disclosure. As shown, wearable audio output device 20 includes similar components as wearable audio output device 10, and further includes one or more external microphones 222 on casing 210. One or more external microphones 222 may be acoustically coupled to an environment outside the ear canal of the user.

External microphone(s) 222 may capture air-conducted speech (e.g., sound waves in the open-air). Although the air-conducted microphone picks up full-band speech, it is less immune to environment noise. Accordingly, some aspects described herein, may be described with respect to wearable audio output device 10 comprising only in-ear microphone(s) 118, while other aspects may be described with respect to wearable audio output device 20 comprising both in-ear microphone(s) 218 and external microphone(s) 222.

Each earbud 100 of wearable audio output device 10 may be connected to audio processing system 130, while each earbud 200 of wearable audio output device 20 may be connected to audio processing system 220. Audio processing systems 130, 230 may be integrated into one or both earbuds 10, 20, respectively, or be implemented by an external system. Audio processing systems 130, 230 may include hardware, firmware, and/or software to provide various features to support operations of the wearable audio output devices 10, 20, respectively, including, e.g., providing a power source, amplification, input/output (I/O), signal processing, data storage, data processing, voice detection, etc.

Wearable audio output devices 10, 20 may be configured to provide two-way communications in which a user's voice, or speech, is captured and then output to an external node via the audio processing system 10, 20, respectively. Processing audio signals captured by in-ear microphone(s), alone or in combination with external microphone(s), may include subjecting audio signals to various techniques and/or algorithms to improve the audio quality. According to certain aspects described herein, to further enhance audio quality of voice pick-up, a speech enhancement deep learning model may be introduced in the processing system to predict high frequency band information. Treble lost in audio signals captured by in-ear microphones may be restored using the predictive high frequency band information.

The addition of a speech enhancement deep learning model may allow for robust user voice pick-up. Hence, a person or a speech recognition system on the other end, communicating with a user of the wearable audio output device, may be able hear and understand the user more clearly.

Figure 3:
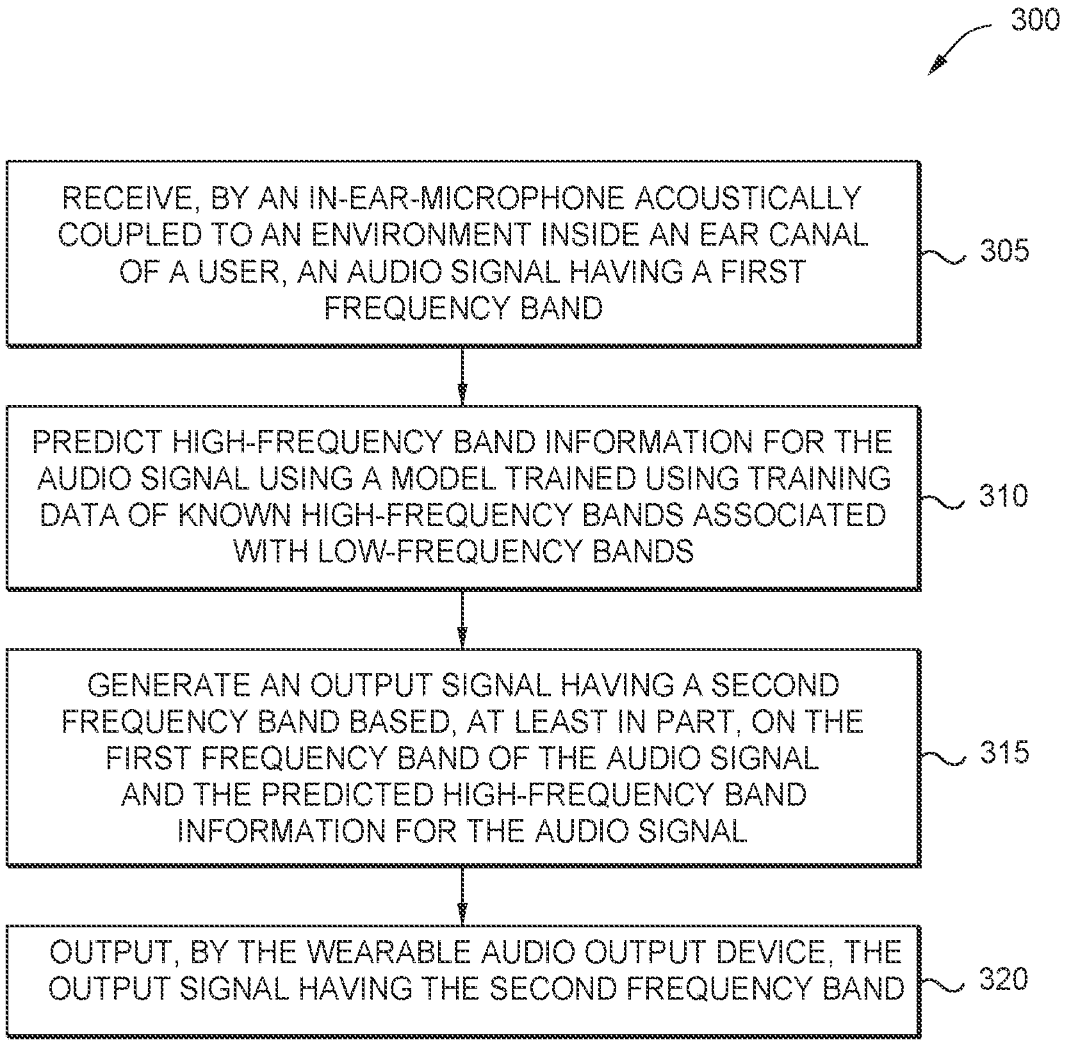
FIG. 3 is a flow diagram illustrating example operations for recovering audio quality of voice using a deep learning model, in accordance with certain aspects of the present disclosure.

FIG. 3 is a flow diagram illustrating example operations for recovering audio quality of voice using a deep learning model, in accordance with certain aspects of the present disclosure. The operations 300 may be performed by a wearable audio output device, such as the wearable audio output device described with respect to FIGS. 1 and 2.

The operations 300 begin, at block 305 by the wearable audio output device receiving, by an in-ear microphone acoustically coupled to an environment inside an ear canal of a user, an audio signal having a first frequency band. A first frequency band of the audio signal captured by the in-ear microphone may have a limited bandwidth, for reasons discussed herein. For example, the audio signal may have a limited bandwidth with a high frequency roll-off at about 2 kHz.

At block 310, the wearable audio output device predicts high-frequency band information for the audio signal using a model trained using training data of known high-frequency bands associated with low-frequency bands. Predicting high-frequency band information for the audio signal using the trained model may include extracting low-frequency band information of the first frequency band and selecting the high-frequency band information based at least in part on a mapping between the low-frequency band information and the high-frequency band information in the trained model. In some cases, the trained model may be further trained based on receiving feedback associated with a voice of a user of the audio output device. In some cases, the trained model may be a trained deep neural network.

At block 315, the wearable audio output device generates an output signal having a second frequency band based, at least in part, on the first frequency band of the audio signal and the predicted high-frequency band information for the audio signal. The second frequency band of the output signal may include a dynamic range greater than a dynamic range of the first frequency band. For example, high frequency components of the audio signal that were attenuated due to channel loss may be predicted based, at least in part, on the first frequency band of the audio signal. Predicted high-frequency band information may be used to supplement bandwidth of the first frequency band to output audio with a second frequency band having a greater dynamic range.

At block 320, the wearable audio output device outputs, by the in-ear microphone, the output signal having the second frequency band. In some cases, the audio signal may be output to an external node used for two-way communication.

Figure 4:
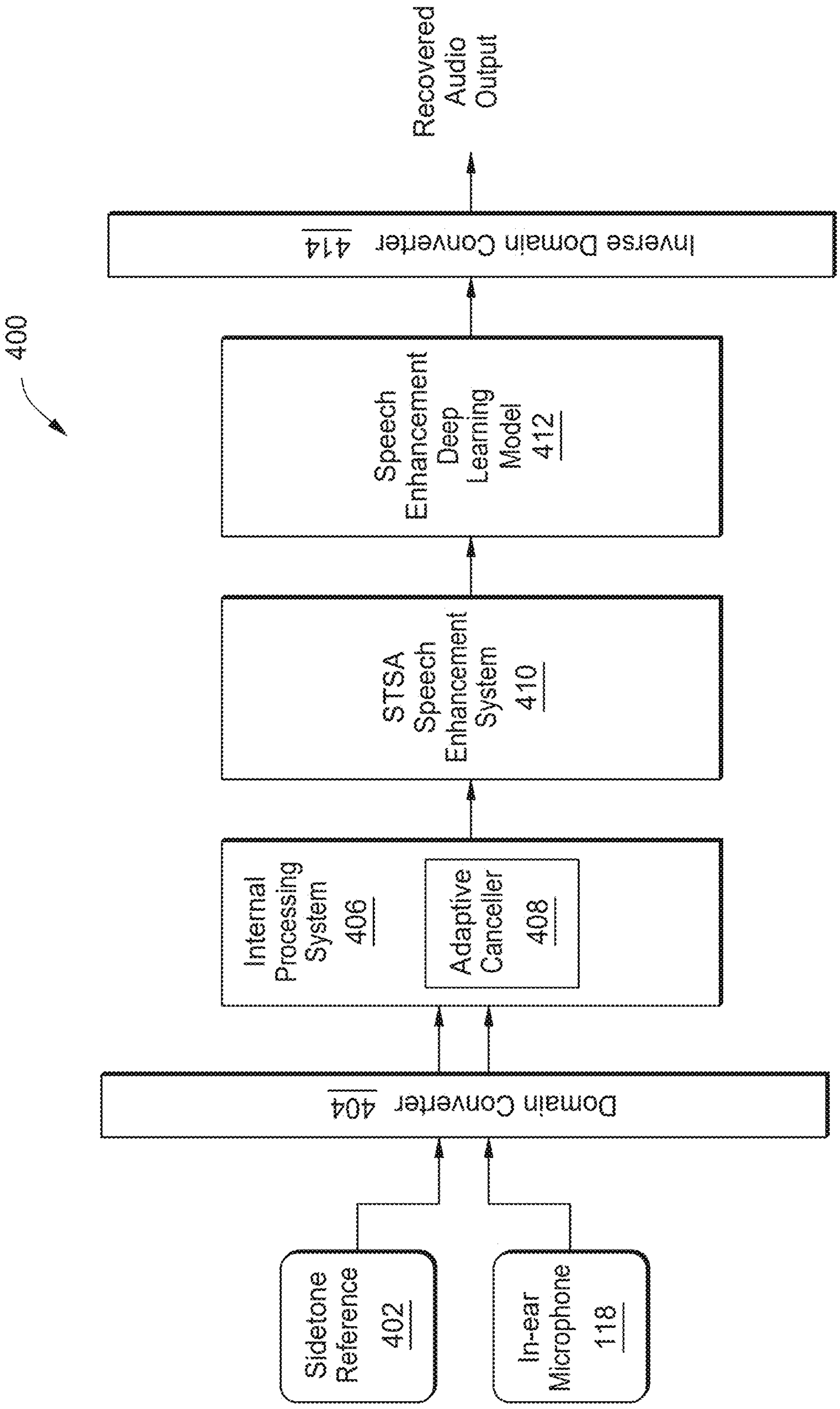
FIG. 4 is an example implementation of the techniques for recovery of audio quality of voice captured by an in-ear microphone, in accordance with certain aspects of the present disclosure.
Figure 5:
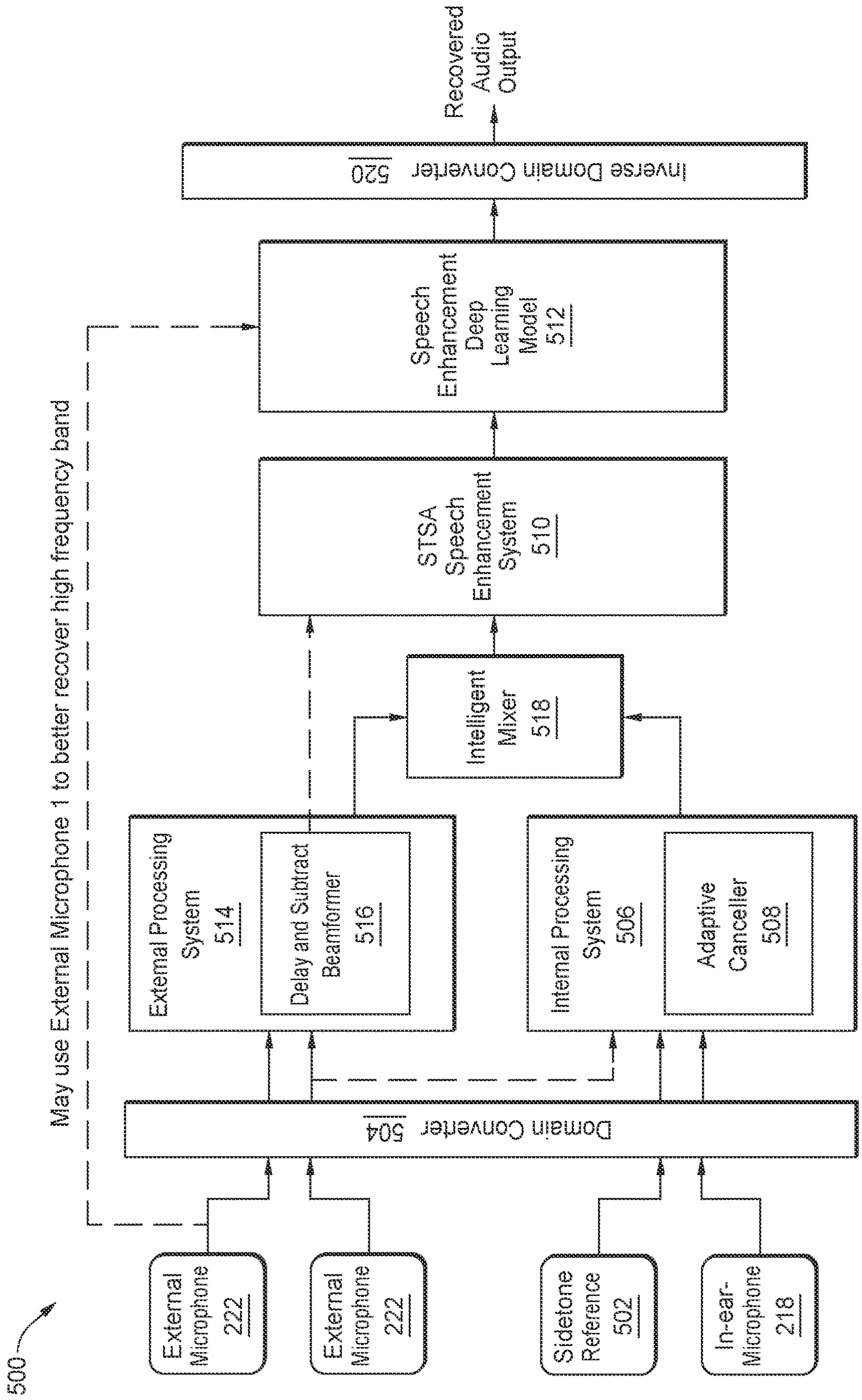
FIG. 5 is an example implementation of the techniques for active noise reduction and recovery of audio quality of voice captured by an in-ear microphone, in accordance with certain aspects of the present disclosure.

Operations 300 of FIG. 3 may be understood with reference to audio signal processing shown in FIGS. 4 and 5, which illustrate techniques for recovery of audio quality of voice captured by an in-ear microphone, in accordance with certain aspects of the present disclosure. The illustrative example implementation of FIG. 4 may apply to audio signals captured by only in-ear microphone(s) and processed to improve audio quality. The illustrative example implementation of FIG. 5 may apply to audio signals captured by both in-ear microphone(s) and external microphone(s) and processed to improve audio quality.

FIG. 4 is an example implementation 400 of the techniques for recovery of audio quality of voice captured by an in-ear microphone, in accordance with certain aspects of the present disclosure. As shown in FIG. 4, an in-ear microphone 118 may be configured to capture audio signals, e.g., bone and tissue conducted speech, in an ear canal of a user. The audio signal picked-up by in-ear microphone 118 may be fed to a domain converter 404 configured to perform Fourier transform by translating audio signals in the time (i.e., acoustic) domain into the frequency (i.e., electrical) domain.

Additionally, a sidetone reference may be fed to the domain converter 404 for Fourier transform. Sidetone reference 402 may is audible feedback to a person speaking or otherwise producing sound as an indication of active transmission. In the field of telephony, it is known to introduce an electric sidetone path to allow a person speaking to hear his/her own voice, even when an ear of the person is occluded by an earbud. The provision of a sidetone reference 402 (i.e., electric sidetone path) may recreate airborne sound inside the ear canal; however, the sidetone reference 402 may not completely address or counteract the occlusion effect created by using an in-ear microphone. Accordingly, aspects presented herein may be implemented to recover dynamic range (e.g., high frequency band information) of voice picked up by the in-ear microphone 118.

An internal processing system 406 includes an adaptive canceller 408. Adaptive canceller 408 plays an important role in audio signal processing by removing echo, reverberation, and unwanted noise. Adaptive canceller 408 may be a robust algorithm which takes two or more inputs and produces an output. For example, in implementation 400, adaptive canceller 408 may clean and filter domain converted sidetone reference 402 and domain converted audio signal from in-ear microphone 118 to produce a single output for short-time spectral amplitude (STSA) speech enhancement system 410. The output may be a noise reduced internal signal.

In some cases, adaptive canceller 408 may be preloaded with noise reduction parameters (e.g., predetermined filter coefficients) to be applied to internal audio signal(s) to eliminate echo, reverberation, and/or noise. In some cases (e.g., where an external signal is fed to adaptive canceller 408), adaptive canceller 408 calculates noise reduction parameters (e.g., filter coefficients) based on external signal(s) and applies the parameters to internal audio signals (e.g., audio signals captured by in-ear microphone 118). Adaptive canceller 408 may adaptively determine filter coefficients, during periods where no voice signal is detected (e.g., via a voice activity detector (VAD)), using any well-known adaptive algorithms, such as the normalized leas means square (NLMS) algorithm.

Adaptive canceller 408 may freeze calculated and/or preloaded coefficients during periods where speech activity is detected (e.g., via the VAD) and apply these coefficients to internal audio signal(s) to eliminate echo, reverberation, and/or noise. The noise reduced internal signal produced by adaptive canceller 408 may have a high SNR due to an occlusion boost of the voice signal in the ear canal and the cancellation of noise using calculated and/or preloaded coefficients. Adaptive canceller 408 may further remove the sidetone reference 402 such that the noise reduced audio signal is free of the audible feedback prior to feeding the output signal to STSA speech enhancement system 410.

STSA speech enhancement system 410 may be used to clean up low-level acoustic noise using an STSA estimation technique such as spectral subtraction. The noise reduced audio signal may be applied to STSA speech enhancement system 410 accordingly.

According to certain aspects of the present disclosure, the noise reduced audio signal may be further processed in accordance with a speech enhancement deep learning model 412. The speech enhancement deep learning model 412 may be deployed on-board a user's wearable audio output device (e.g., such as wearable audio output devices 10, 20 of FIGS. 1 and 2, respectively), on a portable user device communicatively coupled with earbuds of a wearable audio device, or other suitable locations.

A "model" may include a combination of an algorithm and configuration details that can be used to make a new prediction based on a new set of input data. More specifically, the speech enhancement deep learning model 412 may be used to predict high frequency band information for the noise reduced signal. High frequencies lost in audio signals captured by in-ear microphones may be restored using the predictive high frequency band information.

The trained model may provide mapping between low-frequency bands and high-frequency bands in audio signals. The model may be trained by a large set of data, including one or more windows of audio data, and neural network architectures that contain many layers. While many machine learning systems are seeded with initial features and/or network weights to be modified through learning and updating of the machine learning network, a deep learning network trains itself to identify "good" features for analysis. Using multilayered architecture, machines employing deep learning techniques may process raw data better than machines using conventional machine learning techniques. Examining data for groups of highly correlated values or distinctive themes is facilitated using different layers of evaluation or abstraction.

In some examples, a network operating in time-domain may receive a window of audio stream (or multiple windows of audio streams where multiple microphone inputs are being used, such as when both in-ear and external microphones are used) and use this audio stream to learn an ideal mapping between low-frequency bands and high-frequency bands in audio signals. In such a case, domain converter 404 may be configured to translate the time-domain audio signals into frequency domain audio signals, and vice versa. Alternatively, in some other examples, a network operating in frequency-domain may receive a window of audio stream (or multiple windows of audio streams) to learn an ideal mapping between low-frequency bands and high-frequency bands in audio signals. In such a case, domain converter 404 may not be necessary.

According to certain aspects, the trained model may be further trained based on receiving feedback associated with a voice of a user of the audio output device. Human vocalizations may generate acoustical energy at frequencies up to about 20 kHz, and each person may have a different voice frequency band within this large range of frequencies. Accordingly, in aspects, a user may use an external microphone to capture the full-band spectrum of their voice for personalization of the speech enhancement deep learning model 412. As described herein, external microphones may be beneficial in capturing full-band speech; therefore, external audio voice signals picked up by the external microphone (e.g., in a quiet environment) may be used to further inform the deep learning model 412. The model 412 may learn about high-frequency and low-frequency correlations that are specific to the user.

According to certain aspects, in addition to restoring high frequencies of the audio signal captured by in-ear microphone 118, speech enhancement deep learning model 412 may also be used to improve audio quality of low frequencies of the audio signal. For example, unnaturalness in lower frequencies of bone and tissue conducted speech captured by in-ear microphone 118 may occur where phonemes become exaggerated. Speech enhancement deep learning model 412 may be used to correct such distortions in these lower frequencies. Weights in the network (e.g., operating in time-domain or frequency-domain) may learn to modulate both high frequency and low frequency signals to match signals of a reference microphone. For example, the network may receive a muffled sound (e.g., "shhhh") and attempt to translate/encode the sound to an intermediate representation (e.g., <sh>). The network may then decode the intermediate representation into a more natural sounding audio signal (e.g., more natural sounding "shhhh") to be used for output. In the process of decoding the intermediate representation back to an audio signal, the network may predict how the intermediate representation may sound in both the high frequency domain and the low frequency domain.

In some aspects, the model may be trained offline prior to deployment in the signal processing implementation 400 of FIG. 4. The model may be re-trained and subsequently deployed, as necessary, to improve performance in implementation 400. In some aspects, the model may be trained in real-time.

The output signal from speech enhancement deep learning model 412 may be passed through inverse domain converter 414 to convert the signal from the frequency (i.e., electrical) domain to the time (i.e., acoustic) domain such that the audio may be output for communication.

The recovered audio output, after processing through implementation 400, may have a dynamic range greater than a dynamic range of the speech captured by in-ear microphone 118. The dynamic range of the output audio may be based, at least in part, on a frequency band of the audio signal captured by in-ear microphone 118 and high-frequency band information predicted using speech enhancement deep learning model 412. More specifically, predicted high-frequency band information may be used to supplement bandwidth of the audio signal captured by in-ear microphone 118 to produce more natural sounding audio output for communication.

In-ear microphones coupled with deep learning to recover audio quality of voice captured by these microphones may allow for cost and power efficient wearable audio output device designs. Enhancing audio quality using a deep learning model removes the need for external and/or additional microphones that may contribute to overall cost and/or power consumption of the wearable audio device. Additional or larger microphones may not be necessary to produce intelligible and natural sounding voice for communication where deep learning is used to recover audio quality lost for bone and tissue conducted speech captured by in-ear microphones.

In some implementations, a wearable audio device may include one or more external microphones. Wearable audio devices which incorporate one or more external microphones may be used to further enhance audio quality of voice. As described herein, one or more external microphones may be beneficial in capturing a user's full-band speech; however, noisy environments significantly hinder use of such microphones. Accordingly, to provide optimal audio quality while maintaining intelligibility in noisy environments, speech captured by both in-ear microphone(s) and external microphone(s) may be processed to produce an output signal with a high SNR and increased intelligibility. Further, an external microphone of the wearable audio device may better inform predictions of high-frequency band information by the speech enhancement deep learning model 412 to enhance audio quality of voice.

FIG. 5 is an example implementation 500 of the techniques for recovery of audio quality of voice captured by an in-ear microphone, in accordance with certain aspects of the present disclosure. As shown in FIG. 5, an in-ear microphone 218 may be configured to capture audio signals, e.g., bone and tissue conducted speech, in an ear canal of a user while one or more external microphones 122 may be configured to capture at least one external signal, e.g., air conducted speech. Each signal may be fed to domain converter 504 for Fourier Transform. Similar to FIG. 4, sidetone reference 502 may also be input to domain converter 504 for initial signal processing.

In some cases, one or more external microphones 222 may be used to prompt active noise reduction (ANR) to produce further enhanced quality of signals. Comparing signal energy of at least one external signal captured by one or more external microphones 222 with signal energy of audio signal captured by in-ear microphone 218 may indicate a location of the wearable audio device. For example, the wearable audio device may be determined to be in a noisy environment when signal energy of the external signal is greater than signal energy of the internal signal, thus prompting processing of the signal using ANR to remove excess noise.

Adaptive canceller 508 may perform similar functions as adaptive canceller 408 in FIG. 4; however, one or more domain converted external signals from one or more external microphones 222 may be used in calculating filter coefficients used to eliminate echo, reverberation, and/or noise. Accordingly, the noise reduced signal may have an increased SNR.

Unlike FIG. 4, the implementation of FIG. 5 may include an external processing system 516 to process one or more external signals captured by one or more external microphones 222. External processing system 516 may include a null beamformer, such as a delay and subtract (D&S) beamformer. The D&S beamformer may time align and equalize the two external microphone to mouth direction signals and subtract to provide a noise correlated reference signal. In other words, the D&S beamformer may be used to null out speech captured by one or more external microphones 222 and isolate only noise signal. Other techniques may be considered to minimize speech pickup in the mouth direction. Isolated noise signal may be fed to STSA speech enhancement system 510 which uses the noise correlated signal as a reference in performing spectral subtraction to remove noise from a mixed signal.

Output from external processing system 516 and output from internal processing system 506 may be combined at intelligent mixer 518 to produce a mixed signal. In environments having high levels of external noise, intelligent mixer 518 may favor output from internal processing system 506, and in some cases, include only output from internal processing system 506 in the mixed signal. In environments having low levels of external noise, intelligent mixer 518 may favor output from external processing system 516, and in some cases, include only output from external processing system 516. Other factors, including movement (e.g., acceleration) of a user, may also be a factor in determining how much of each output may be mixed to produce signal with both minimal noise and sufficient dynamic range.

Similar to FIG. 4, the mixed signal may be further processed through an STSA speech enhancement system 510 configured to perform spectral subtraction. As described herein, a noise correlated reference signal from D&S beamformer may be used to inform spectral subtraction by STSA speech enhancement system 510. For example, a noise correlated reference signal may be an input to STSA speech enhancement system 510 in cases where ANR is triggered to remove superfluous noise captured as a result of the wearable audio output device being located in a noisy environment. STSA speech enhancement system 510 may produce an output signal (e.g., noise reduced audio signal) with an improved SNR. Additional details regarding the internal processing system 506, the external processing system 514, the intelligent mixer 518, and the STSA speech enhancement system 510 may be found in U.S. patent application Ser. No. 16/999,353, filed Aug. 21, 2020, titled "WEARABLE AUDIO DEVICE WITH INNER MICROPHONE ADAPTIVE NOISE REDUCTION," the complete disclosure of which is incorporated herein by reference.

Similar to FIG. 4, the noise reduced audio signal may be further processed in accordance with a speech enhancement deep learning model 412 to restore high frequencies lost when using an in-ear microphone to capture speech. Further, the output signal from speech enhancement deep learning model 512 may be passed through inverse domain converter 520 to convert the signal from the frequency domain to the time domain such that the audio may be output for communication.

The recovered audio output, after processing through implementation 500, may have an improved SNR and a dynamic range greater than a dynamic range of the speech captured by in-ear microphone 218. Accordingly, a wearable audio output device comprising both an external microphone and an in-ear microphone may be an ideal implementation to overcome the shortcomings of each microphone being used in isolation to capture speech. The in-ear microphone may remove undesired, excess noise while the external microphone may capture the full-band of speech to aid in fabricating a more natural and intelligible audio signal for communication.

It can be noted that, descriptions of aspects of the present disclosure are presented above for purposes of illustration, but aspects of the present disclosure are not intended to be limited to any of the disclosed aspects. Many modifications and variations will be apparent to those of ordinary skill in the art without departing from the scope and spirit of the described aspects.

In the preceding, reference is made to aspects presented in this disclosure. However, the scope of the present disclosure is not limited to specific described aspects. Aspects of the present disclosure can take the form of an entirely hardware aspect, an entirely software aspect (including firmware, resident software, micro-code, etc.) or an aspect combining software and hardware aspects that can all generally be referred to herein as a “component,” “circuit,” “module” or “system.” Furthermore, aspects of the present disclosure can take the form of a computer program product embodied in one or more computer-readable medium(s) having computer-readable program code embodied thereon. In aspects, the computer-readable medium may be embodied in one or more non-transitory computer-readable medium(s) having computer-readable program code embodied thereon.

Any combination of one or more non-transitory computer readable medium(s) can be utilized. The non-transitory computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium can be any tangible medium that can contain, or store a program.

The flowchart and block diagrams in the Figures illustrate the architecture, functionality and operation of possible implementations of systems, methods and computer program products according to various aspects. In this regard, each block in the flowchart or block diagrams can represent a module, segment or portion of code, which comprises one or more executable instructions for implementing the specified logical function(s). In some alternative implementations the functions noted in the block can occur out of the order noted in the figures. For example, two blocks shown in succession can, in fact, be executed substantially concurrently, or the blocks can sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

The invention claimed is:

1. A method for recovering audio quality of voice when processing signals associated with a wearable audio output device, comprising:

receiving, by an in-ear microphone acoustically coupled to an environment inside an ear canal of a user, an audio signal having a first frequency band;

receiving an external signal from an environment outside the ear canal of the user;

determining the environment outside the ear of the user comprises a noisy environment by comparing a signal energy of the audio signal to a signal energy of the external signal;

predicting high-frequency band information for the audio signal using a model trained using training data of known high-frequency bands associated with low-frequency bands;

generating an output signal having a second frequency band based, at least in part, on the first frequency band of the audio signal and the predicted high-frequency band information for the audio signal; and outputting, by the wearable audio output device, the output signal having the second frequency band.

2. The method of claim 1, wherein the second frequency band of the output signal comprises a dynamic range greater than a dynamic range of the first frequency band.

3. The method of claim 1, wherein predicting high-frequency band information for the audio signal using the model trained using training data of known high-frequency bands associated with low-frequency bands comprises:

extracting low-frequency band information of the first frequency band; and selecting the high-frequency band information based at least in part on a mapping between the low-frequency band information and the high-frequency band information in the trained model.

4. The method of claim 1, wherein the external signal is received by an external microphone acoustically coupled to the environment outside of the ear canal of the user.

5. The method of claim 4, further comprising:

processing the audio signal using active noise reduction (ANR) to produce a noise reduced signal, wherein the noise reduced signal is generated in response to the external signal and has a third frequency band;

predicting high-frequency band information for the noise reduced signal using the trained model; and wherein the output signal is based, at least in part, on the third frequency band of the noise reduced signal and the predicted high-frequency band information for the noise reduced signal.

6. The method of claim 5, wherein processing the audio signal using ANR to produce a noise reduced signal comprises:

calculating a set of noise cancellation parameters in response to the external signal; and utilizing the set of noise cancellation parameters to process the audio signal.

7. The method of claim 1, further comprising:

receiving feedback associated with a voice of the user of the wearable audio output device; and wherein the trained model is further trained based on the feedback.

8. The method of claim 1, wherein the trained model comprises a trained deep neural network.

9. A wearable audio output device, comprising:

at least one in-ear microphone acoustically coupled to an environment inside an ear canal of a user, the at least one in-ear microphone configured to receive an audio signal having a first frequency band;

at least one processor and a memory coupled to the at least one in-ear microphone, the memory including instructions executable by the at least one processor to cause the wearable audio output device to:

receive an external signal from an environment outside the ear canal of the user;

determine the environment outside the ear of the user comprises a noisy environment by comparing a signal energy of the audio signal to a signal energy of the external signal;

predict high-frequency band information for the audio signal using a model trained using training data of known high-frequency bands associated with low-frequency bands; and generate an output signal having a second frequency band based, at least in part, on the first frequency band of the audio signal and the predicted high-frequency band information for the audio signal; and at least one speaker coupled to the at least one in-ear microphone, the at least one speaker configured to:

output the output signal having the second frequency band.

10. The wearable audio output device of claim 9, wherein the second frequency band of the output signal comprises a dynamic range greater than a dynamic range of the first frequency band.

11. The wearable audio output device of claim 9, wherein in order to predict high-frequency band information for the audio signal using the model trained using training data of known high-frequency bands associated with low-frequency bands, the memory further includes instructions executable by the at least one processor to cause the wearable audio output device to:

extract low-frequency band information of the first frequency band; and select the high-frequency band information based at least in part on a mapping between the low-frequency band information and the high-frequency band information in the trained model.

12. The wearable audio output device of claim 9, further comprising:

at least one external microphone acoustically coupled to the environment outside the ear canal of the user, wherein the at least one external microphone is configured to receive the external signal.

13. The wearable audio output device of claim 12, wherein the memory further includes instructions executable by the at least one processor to:

process the audio signal using active noise reduction (ANR) to produce a noise reduced signal, wherein the noise reduced signal is generated in response to the external signal and has a third frequency band;

predict high-frequency band information for the noise reduced signal using the trained model; and wherein the output signal is based, at least in part, on the third frequency band of the noise reduced signal and the predicted high-frequency band information for the noise reduced signal.

14. The wearable audio output device of claim 13, wherein in order to process the audio signal using ANR to produce a noise reduced the memory further includes instructions executable by the at least one processor to cause the wearable audio output device to:

calculate a set of noise cancellation parameters in response to the external signal; and utilize the set of noise cancellation parameters to process the audio signal.

15. The wearable audio output device of claim 9, wherein the memory further includes instructions executable by the at least one processor to:

receive feedback associated with a voice of the user of the wearable audio output device; and wherein the trained model is further trained based on the feedback.

16. The wearable audio output device of claim 9, wherein the trained model comprises a trained deep neural network.

17. A computer-readable device storing instructions which when executed by at least one processor performs a method for recovering audio quality of voice when processing signals associated with a wearable audio output device, the method comprising:

receiving, by an in-ear microphone acoustically coupled to an environment inside an ear canal of a user, an audio signal having a first frequency band;

receiving an external signal from an environment outside the ear canal of the user;

determining the environment outside the ear of the user comprises a noisy environment by comparing a signal energy of the audio signal to a signal energy of the external signal;

predicting high-frequency band information for the audio signal using a model trained using training data of known high-frequency bands associated with low-frequency bands;

generating an output signal having a second frequency band based, at least in part, on the first frequency band of the audio signal and the predicted high-frequency band information for the audio signal; and outputting, by the wearable audio output device, the output signal having the second frequency band.

18. The computer-readable device of claim 17, wherein the second frequency band of the output signal comprises a dynamic range greater than a dynamic range of the first frequency band.

19. The computer-readable device of claim 17, wherein predicting high-frequency band information for the audio signal using the model trained using training data of known high-frequency bands associated with low-frequency bands comprises:

extracting low-frequency band information of the first frequency band; and selecting the high-frequency band information based at least in part on a mapping between the low-frequency band information and the high-frequency band information in the trained model.

20. The computer-readable device of claim 17, the external signal is received by an external microphone acoustically coupled to the environment outside of the ear canal of the user.

* * * * *